United States Patent [19]

Magnet

[11] Patent Number: 5,150,682
[45] Date of Patent: Sep. 29, 1992

[54] METHOD OF MONITORING EMISSION OF NITROGEN OXIDES BY AN INTERNAL COMBUSTION ENGINE

[75] Inventor: Jean-Louis Magnet, St. Germain en Laye, France

[73] Assignee: S.E.M.T. Pielstick, France

[21] Appl. No.: 765,735

[22] Filed: Sep. 26, 1991

[30] Foreign Application Priority Data

Sep. 26, 1990 [FR] France ................................ 90 11860

[51] Int. Cl.⁵ ........................ F02B 77/08; F02P 5/155
[52] U.S. Cl. .................................. 123/417; 123/25 J; 123/486; 73/116
[58] Field of Search .................. 73/116, 35; 123/25 J, 123/416, 417, 478, 480, 486

[56] References Cited

U.S. PATENT DOCUMENTS

| | | | |
|---|---|---|---|
| 4,161,162 | 7/1979 | Latsch et al. ...................... | 123/43 S |
| 4,271,811 | 6/1981 | Suzuki et al. ........................ | 123/571 |
| 4,331,117 | 5/1982 | Ginsburgh ........................... | 123/417 |
| 4,406,255 | 9/1983 | Goodman ........................... | 123/25 J |
| 4,887,574 | 12/1989 | Kuroiwa et al. ..................... | 73/116 |
| 4,909,072 | 3/1990 | Logothetis et al. ................. | 73/116 |
| 4,959,638 | 9/1990 | Palmer ................................ | 73/116 |

FOREIGN PATENT DOCUMENTS

0241781 10/1987 European Pat. Off. .

OTHER PUBLICATIONS

French Search Report
Revue Automobile, vol. 85, No. 15, Apr. 5, 1990, "du capteur de vibrations au diagramme de pression de combustion", Berne CH, pp. 17-17, by M. B. Mahr.

*Primary Examiner*—E. Rollins Cross
*Assistant Examiner*—Erick Solis
*Attorney, Agent, or Firm*—Sughrue, Mion, Zinn, Macpeak & Seas

[57] ABSTRACT

In a method of monitoring the emission of nitrogen oxides $NO_x$ in the exhaust gas of an internal combustion engine, the engine to be monitored incorporates an accelerometer used as a sensor. The signals produced by the accelerometer are analyzed to determine the $NO_x$ concentration in the engine exhaust gas by comparison with data supplied by an accelerometer fitted to a control engine.

9 Claims, No Drawings

METHOD OF MONITORING EMISSION OF NITROGEN OXIDES BY AN INTERNAL COMBUSTION ENGINE

BACKGROUND OF THE INVENTION

1. Field of the invention

The present invention concerns a method of monitoring the emission of nitrogen oxides in the exhaust gas of an internal combustion engine.

2. Description of the prior art

Internal combustion engines are a major source of pollutant gases in the atmosphere. They expel combustion residues including nitrogen oxides NO and $NO_2$Nitrogen oxides, generically denoted $NO_x$, are exhausted into the atmosphere in varying amounts according to the engine operating conditions.

The toxicity of nitrogen oxides exhausted by heat engines is fully determined and this has lead various countries to draw up regulations governing the emission of pollutant gases.

The nitrogen oxides comprise nitrogen monoxide NO which is mainly formed in the engine at the combustion temperatures and nitrogen dioxide $NO_2$ which is obtained when the nitrogen monoxide NO comes into contact with oxygen, in particular the oxygen in the atmosphere.

The concentrations of nitrogen monoxide and consequently of nitrogen dioxide depend on various parameters including: the temperature of the combustion gases, the time available for the reactions to take place and the richness of the fuel/air mixture.

The emission of nitrogen oxides $NO_x$ can therefore be reduced by modifying the parameters which favor their formation. However, it is known that the emission of $NO_x$ is generally maximal when the engine adjustments are optimized from the point of view of efficiency.

As internal combustion engines can operate on multiple sites and/or under different conditions, for example when installed on railroad locomotives, problem arises of being able to determine their nitrogen oxide emission quickly on site and to adjust the engine so as to comply with regulations whilst maintaining the highest possible efficiency.

In some cases it may be beneficial to preserve data on the concentrations of $NO_x$ for subsequent use.

A known way to determine the $NO_x$ concentration of exhaust gas is to use a physical/chemical gas analyzer; this is a complex, costly, heavy, fragile and bulky piece of equipment. Also, this equipment does not lend itself well to computer processing of the measurement results.

What is required is to be able to detect the $NO_x$ concentration using a simple, inexpensive and rugged device which can be installed permanently on the engine, able to operate in real time but also able to supply usable data after a relatively long interval (the data should be storable magnetically, for example). The $NO_x$ concentration and its variations should be measurable relative to a reference level. Finally, it should be possible to apply a correction immediately the $NO_x$ concentration exceeds the permitted standards or drops too low, which may mean that the efficiency of the engine is too low.

The present invention proposes to meet these conditions by using an accelerometer as a sensor and by analyzing the signals supplied by the sensor to evaluate the concentration of $NO_x$ in the exhaust gas of an internal combustion engine by comparison with data supplied by an accelerometer fitted to a control engine.

SUMMARY OF THE INVENTION

The present invention consists in a method of monitoring the emission of nitrogen oxides $NO_x$ in the exhaust gas of an internal combustion engine, in which method:

an accelerometer is installed on one of the components delimiting the combustion chamber of a control engine analogous to the engine to be monitored, a known device for measuring the emission of nitrogen oxides in the exhaust gas of the control engine is installed, the control engine is operated at various loads and at various speeds to cover the full operating range of the control engine, there are recorded simultaneously data concerning the accelerometer signal, a characteristic parameter of which is calculated, the measured quantity of nitrogen oxides $NO_x$ contained in the exhaust gas of the control engine and characteristic engine operating parameters, including at least its speed, load and cylinder inlet air temperature, on the basis of the recorded data, a correlation is established between the measured quantity of nitrogen oxides and the characteristic parameter of the accelerometer signal, an accelerometer is installed on the engine to be monitored under the same conditions as on the control engine, there are simultaneously recorded for the engine to be monitored in operation data concerning the accelerometer signal, the characteristic parameter of which is calculated, and the characteristic engine operation parameters including at least its speed, load and cylinder inlet air temperature, there is established, from the data recorded in the previous stage and from the correlation established for the control engine, an equivalent nitrogen oxide emission value for the engine to be monitored, if appropriate, decisions are taken as to actions needed to comply with a set point value imposed for the emission of nitrogen oxides.

A preferred embodiment of the method in accordance with the invention is described hereinafter by way of non-limiting example.

DETAILED DESCRIPTION OF THE INVENTION

In an internal combustion engine all dynamic phenomena (mechanical and thermal) generate vibration. This fact has already been exploited in methods of detecting pinking and knocking.

It has been found that there is a relationship between the level of vibrations emitted by an internal combustion engine and the concentration of nitrogen oxides $NO_x$ in the engine exhaust. If an accelerometer is fixed to the engine, especially to one of the components delimiting its combustion chamber, it is therefore possible to establish a relationship between one of the parameters characterizing the signal delivered by the accelerometer, for example the spectral power level, and the $NO_x$ concentration.

This observation has been corroborated by tests carried out on a number of internal combustion engines.

Measurements on a control engine therefore enable engines of the same type to be monitored by comparison. This method has the advantage of allowing measurements on a control engine installed in a workshop, which facilitates the installation of a physical-chemical $NO_x$ analyzer and sampling of the exhaust gas.

The method in accordance with the invention is carried out in the following manner.

An accelerometer is installed on one of the components delimiting the combustion chamber of the control engine. The location chosen for the accelerometer must enable it to sense correctly the vibrations transmitted by the combustion chamber. A known device for measuring the emission of nitrogen oxides in the control engine exhaust is also installed.

The control engine is operated under various loads and at various speeds to cover its full range of operation. Various sorts of data are measured simultaneously: data concerning the signal generated by the accelerometer, data concerning the measured quantity of nitrogen oxides $NO_x$ in the exhaust gas and the characteristic operating parameters of the engine (at least speed, load and air temperature at the cylinder inlet).

The amplitude and frequency of the accelerometer signal are recorded in a frequency range from 0 through 50 000 Hz. The data obtained is used to calculate, for example, the spectral power of the accelerometer signal or a factor representative of this power.

In practice not all of the signal supplied by the accelerometer is of interest, but only the fraction of the signal representing a precise period within the engine cycle and which supplies the information needed to determine the $NO_x$ concentration. This information is contained within a time "window" which includes the start of the combustion phase and which is closed near the end of combustion.

The spectral power of the recovered accelerometer signal represents a certain level of nitrogen oxides as measured by the known physical-chemical monitoring device. It is then possible to establish a correlation between, for example, the spectral power and the nitrogen oxide concentration.

To monitor an engine of the same type as the control engine, it is sufficient to install on the engine to be monitored an accelerometer subject to the same conditions as on the control engine.

Data concerning the accelerometer signal is collected during operation and from it is calculated, for example, the spectral power or a factor representative of this power. The speed, load and cylinder inlet air temperature parameters characterizing the operation of the motor are also collected. An equivalent value of being monitored on the basis of this data and the correlation established for the control engine.

This equivalent nitrogen oxide emission value may lead a user to take a decision on the basis of the emission regulations to be complied with. Various actions are appropriate to modifying the $NO_x$ concentration. Parameters that can be varied include the ignition advance, fuel injection, air temperature, power regulation, fuel (by injection of water, for example), exhaust gas recirculation and excess combustion air.

The method in accordance with the invention has the advantage that using a single control engine it is possible to monitor the emission of nitrogen oxides by means of signals lending themselves particularly well to data storage techniques and to the integration as a parameter in an operating condition control loop, and continuously, if necessary.

Obtaining the parameter characteristic of the accelerometer signal in some other way than by calculating the spectral power is within the scope of the present invention. For example: calculation of the signal peak amplitude value, calculation of the mean or rms value of the signal or of its envelope, calculation of the energy of the accelerometer signal.

There is claimed:

1. Method of monitoring the emission of nitrogen oxides, NOx, in the exhaust gas of an internal combustion engine, comprising the steps of:

installing an accelerometer on a component delimiting a combustion chamber of a control engine analogous to the engine to be monitored, installing a known device for measuring the emission of nitrogen oxides in the exhaust gas of the control engine, operating the control engine at various loads and various speeds to cover the full operating range of the control engine, simultaneously recording data concerning an accelerometer signal, a characteristic parameter of which is calculated, the measured quantity of nitrogen oxides NOx contained in the exhaust gas of the control engine and characteristic engine operating parameters, including at least its speed, loaf and cylinder air inlet temperature, establishing, on the basis of the recorded data, a correlation between the measured quantity of nitrogen oxides and the characteristic parameter of the accelerometer signal, installing an accelerometer on the engine to be monitored subject to the same conditions as on the control engine, simultaneously recording, for the engine to be monitored in operation, data concerning the accelerometer signal, the characteristic parameter of which is calculated, and the characteristic engine parameters including at least its speed, load and cylinder inlet air temperature, establishing, from the data recorded in the previous stage and from the correlations established for the control engine, an equivalent nitrogen oxide emission value for the engine to be monitored, taking decisions, if appropriate, as to actions needed to comply with a set point value imposed of the emission of nitrogen oxides.

2. Method according to claim 1 wherein said characteristic parameter of said accelerometer signal is calculated for a signal included in a time window delimited by the combustion period and for a range of frequencies extending from 0 through 50,000 Hz.

3. Method according to claim 1, wherein said characteristic parameter is obtained by calculating the spectral power of said accelerometer signal or a value representative of said power.

4. Method according to claim 1 wherein said characteristic parameter is obtained by calculating the value of the peak signal amplitude.

5. Method according to claim 1 wherein said characteristic parameter is obtained by calculating the mean of rms value of the signal or of its envelope.

6. Method according to claim 1 wherein said characteristic parameter is obtained by calculating the energy of the accelerometer signal.

7. Method according to claim 1 wherein said action appropriate to complying with said set point value may be modification of the ignition advance or of the fuel injection, modification of the combustion-supporting air temperature or regulation of power.

8. Method according to claim 1 wherein said action appropriate to complying with said set point value may be modification to the nature of the fuel.

9. Method according to claim 8 wherein said modification to the nature of he fuel may be obtained by injection of water.

* * * * *